United States Patent
Yokouchi et al.

(10) Patent No.: US 8,038,569 B2
(45) Date of Patent: Oct. 18, 2011

(54) TRANSMISSION AND POWER TRANSMITTING SYSTEM

(75) Inventors: Yoshimitsu Yokouchi, Toyota (JP); Hideto Watanabe, Toyota (JP); Kunio Takeda, Kariya (JP); Masayuki Tanaka, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 523 days.

(21) Appl. No.: 12/241,448

(22) Filed: Sep. 30, 2008

(65) Prior Publication Data
US 2009/0093335 A1    Apr. 9, 2009

(30) Foreign Application Priority Data
Oct. 5, 2007    (JP) .................... 2007-262499

(51) Int. Cl.
*F16H 3/44*    (2006.01)
(52) U.S. Cl. ........................ 475/327; 475/328
(58) Field of Classification Search ............ 475/327, 475/328, 331
See application file for complete search history.

(56) References Cited

U.S. PATENT DOCUMENTS

| | | | |
|---|---|---|---|
| 6,824,494 B2 * | 11/2004 | Yasuda et al. ............... | 475/327 |
| 7,384,367 B2 * | 6/2008 | Radinger et al. ............ | 475/331 |
| 7,402,120 B2 * | 7/2008 | Andersson et al. .......... | 475/323 |

FOREIGN PATENT DOCUMENTS

| | | |
|---|---|---|
| JP | 62-126624 U | 8/1987 |
| JP | 05-052166 A | 3/1993 |
| JP | 05-32771 U | 4/1993 |
| JP | 2003-34256 A | 2/2003 |
| JP | 2005-308094 A | 11/2005 |
| JP | 2006-10048 A | 1/2006 |

* cited by examiner

*Primary Examiner* — Ha D. Ho
(74) *Attorney, Agent, or Firm* — Sughrue Mion, PLLC

(57) ABSTRACT

A transmission includes: a plurality of rotating elements interposed between a driving source and an output portion; a rotating member that rotatably supports one of the rotating elements and is formed at a radially outer portion thereof with a plurality of recesses or protrusions; a support member having a surface, that is facing the rotating member, and a plurality of protrusions or recesses that are formed in a radially inner portion thereof and engage with the recesses or protrusions of the rotating member, the rotating member being mounted in the support member such that the rotating member is not able to rotate; and a friction producing mechanism that is provided between the rotating member and the above-indicated surface of the support member and is arranged to produce a frictional force between the rotating member and the surface of the support member.

8 Claims, 8 Drawing Sheets

Figure 7:
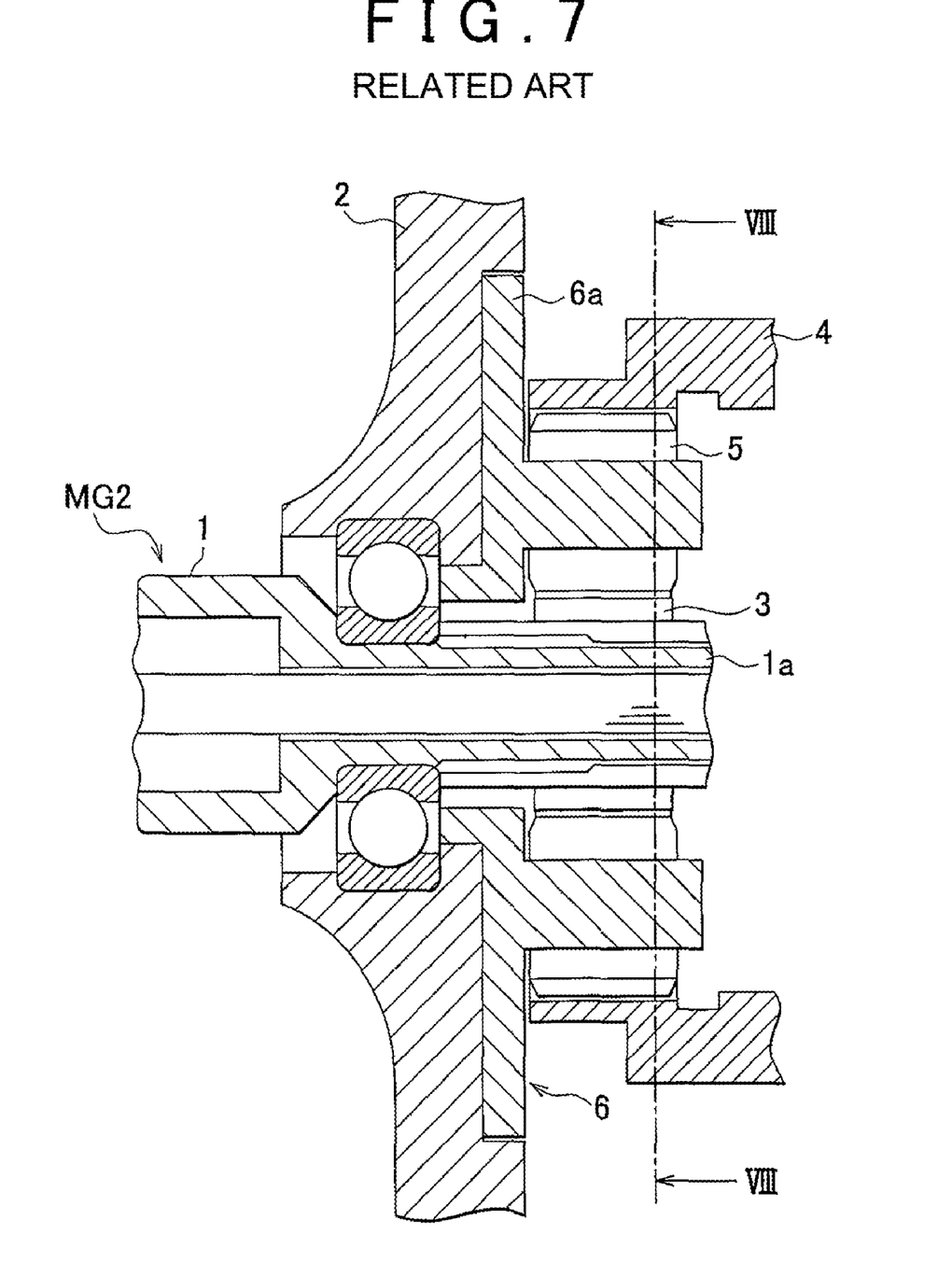
FIG. 7 is a cross-sectional view showing a principal part of a reduction gear of the related art.
Figure 8:
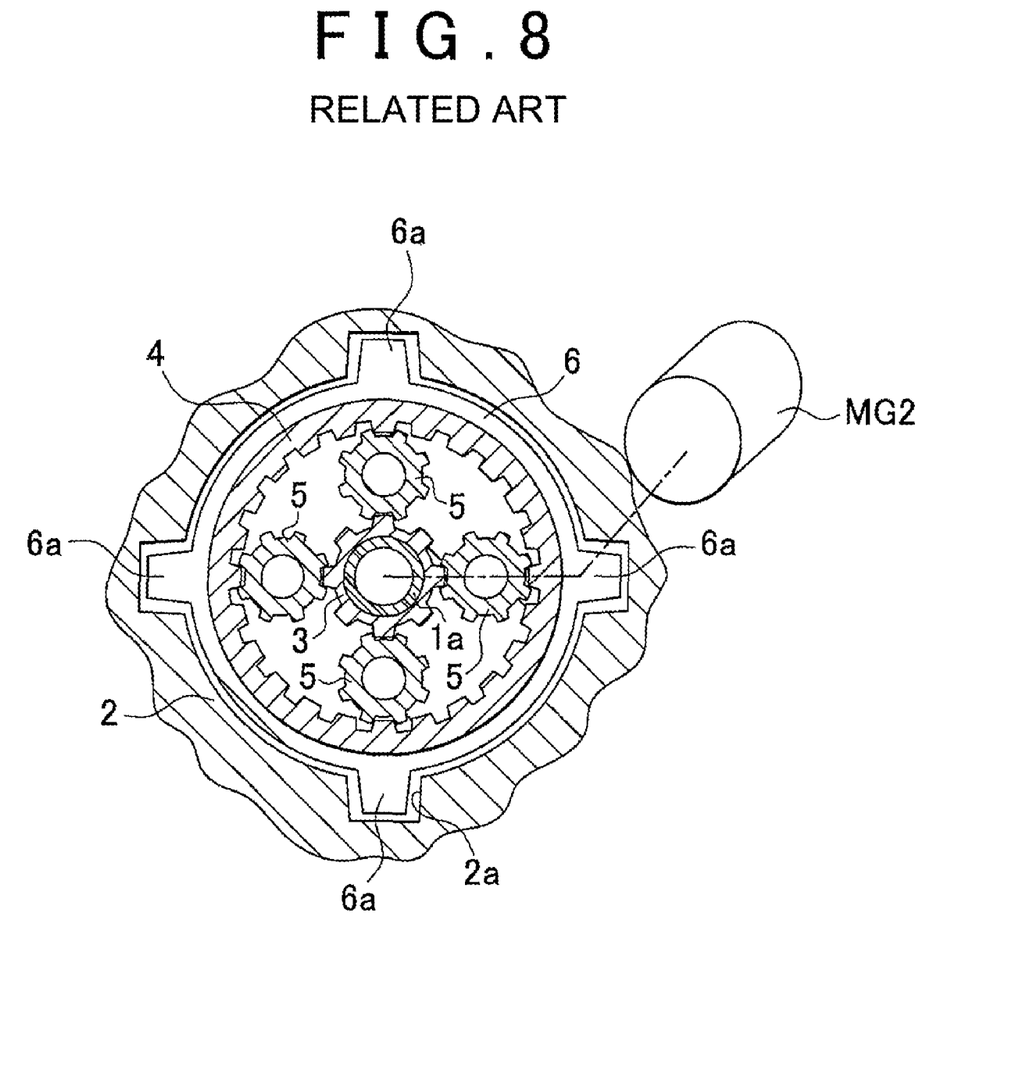
FIG. 8 is a cross-sectional view as seen in the direction of arrows VIII-VIII in FIG. 7.

FIG. 8
RELATED ART ration of the second motor generator MG2. More specifically, the reduction gear includes a sun gear 3 coupled to a rotor shaft 1$a$ formed integrally with the rotor 1, a ring gear 4 that transmits power to driveshafts (as an output portion) of driving wheels (not shown) via a gear mechanism, pinion gears 5 that mesh with the ring gear 4 and the sun gear 3 and transmit rotation of the sun gear 3 to the ring gear 4, and the carrier 6 as the rotating member that rotatably supports the pinion gears 5, as disclosed in, for example, Japanese Patent Application Publication No. 2005-308094 (JP-A-2005-308094). The ring gear 4 is formed integrally with a ring gear of a power distribution mechanism (not shown), and is operable to transmit power to the driveshafts when power of the internal combustion engine is transmitted to the ring gear of the power distribution mechanism.

TRANSMISSION AND POWER TRANSMITTING SYSTEM

INCORPORATION BY REFERENCE

The disclosure of Japanese Patent Application No. 2007-262499 filed on Oct. 5, 2007, including the specification, drawings and abstract, is incorporated herein by reference in its entirety.

BACKGROUND OF THE INVENTION

1. Field of the Invention

The invention relates to a transmission and a power transmitting system, and in particular to a transmission having a rotating member and a support member that supports the rotating member such that the rotating member is not able to rotate, and a power transmitting system including the transmission.

2. Description of the Related Art

Generally, in a hybrid vehicle provided with a power transmitting system that transmits power from an internal combustion engine to driving wheels through engagement of gears, the internal combustion engine, a first motor generator, and a second motor generator connected to the driving wheels via a reduction gear are respectively connected to three rotating elements of a power distribution mechanism. In this type of hybrid vehicle, power of the second motor generator is transmitted to the driving wheels via the reduction gear, so that large power is generated while the size of the second motor generator is reduced.

A known example of the power transmitting system of the related art having the reduction gear is illustrated in FIG. 7 and FIG. 8. In FIG. 7 and FIG. 8, a second motor generator MG2 includes a stator (not shown) that forms a rotating magnetic field, and a rotor 1 disposed inside the stator and having a plurality of permanent magnets embedded therein.

A stator core of the stator of the second motor generator MG2 is formed by, for example, laminating magnetic steel sheets together, and is fixed to an inner circumferential wall of a case 2 as a support member of the power transmitting system.

The reduction gear is constructed such that a carrier as a rotating member that is one of rotating elements of a planetary gearset is fixed to the case 2, so as to reduce the speed of Also, a plurality of protrusions 6$a$ are formed at a radially outer portion of the carrier 6, and a plurality of recesses 2$a$ are formed in the inner circumferential surface of the case 2. Through engagement of the protrusions 6$a$ of the carrier 6 with the recesses 2$a$ of the case 2, the carrier 6 is mounted in the case 2 such that the carrier 6 is not able to rotate relative to the case 2.

In the power transmitting system having the reduction gear as described above, power of the second motor generator MG2 is transmitted to the ring gear 4 via the sun gear 3 and the pinion gears 4, and then transmitted from the ring gear 4 to the driving wheels, so that the speed of rotation of the second motor generator MG2 (i.e., rotor 1) can be reduced by the reduction gear.

In the reduction gear as described above, however, the width of each of the recesses 2$a$ is required to be larger than the width of each of the protrusions 6$a$, so that the carrier 6 can be reliably mounted in the case 2. As a result, gaps are formed between the protrusions 6$a$ and the recesses 2$a$ when the carrier 6 is mounted in the case 2.

With the gaps thus formed between the protrusions 6$a$ and the recesses 2$a$, when torque variations of the internal combustion engine are transmitted from the ring gear 4 to the pinion gears 5, or when torque produced during rotation of the second motor generator MG2 in forward and reverse directions is transmitted to the pinion gears 5 via the sun gear 3, torque may be applied to the carrier 6 that supports the pinion gears 5. As a result, unpleasant sound or noise may occur due to collisions between the protrusions 6$a$ of the carrier 6 and the walls of the recesses 2$a$ of the case 2.

SUMMARY OF THE INVENTION

The present invention provides a reduction gear and a power transmitting system, which make it possible to alleviate or reduce an impact when a rotating member collides with a support member, and thus prevent occurrence of unpleasant sound.

One aspect of the invention relates to a transmission. The transmission includes: a plurality of rotating elements interposed between a driving source and an output portion; a rotating member that rotatably supports one of the rotating elements and is formed at a radially outer portion thereof with a plurality of recesses or protrusions; a support member having a surface, that is facing the rotating member, and a plurality of protrusions or recesses that are formed in a radially inner portion thereof and engage with the recesses or protrusions of the rotating member, the rotating member being mounted in the support member such that the rotating member is not able to rotate; and a friction producing mechanism that is provided between the rotating member and the above-indicated surface of the support member and is arranged to produce a frictional force between the rotating member and the surface of the support member.

According to the above aspect of the invention, the friction producing mechanism is provided between the rotating member and the surface of the support member which is facing the rotating member, for producing frictional force to be applied from the rotating member to the surface of the support member. Therefore, when the rotating member receives external force via the rotating elements, the friction producing mechanism enables the rotating member to rotate gently or slowly relative to the above-indicated surface of the support member. It is thus possible to alleviate or reduce an impact when the rotating member collides with the support member, and prevent occurrence of unpleasant sound due to the collision between the rotating member and the support member.

According to the above aspect of the invention, a reduction gear and a power transmitting system are provided which make it possible to alleviate or reduce an impact when the rotating member collides with the support member, and thus prevent occurrence of unpleasant sound.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

FIG. 1 through FIG. 4 illustrate a first embodiment of the invention in which the invention is applied to a hybrid vehicle.

Figure 1:
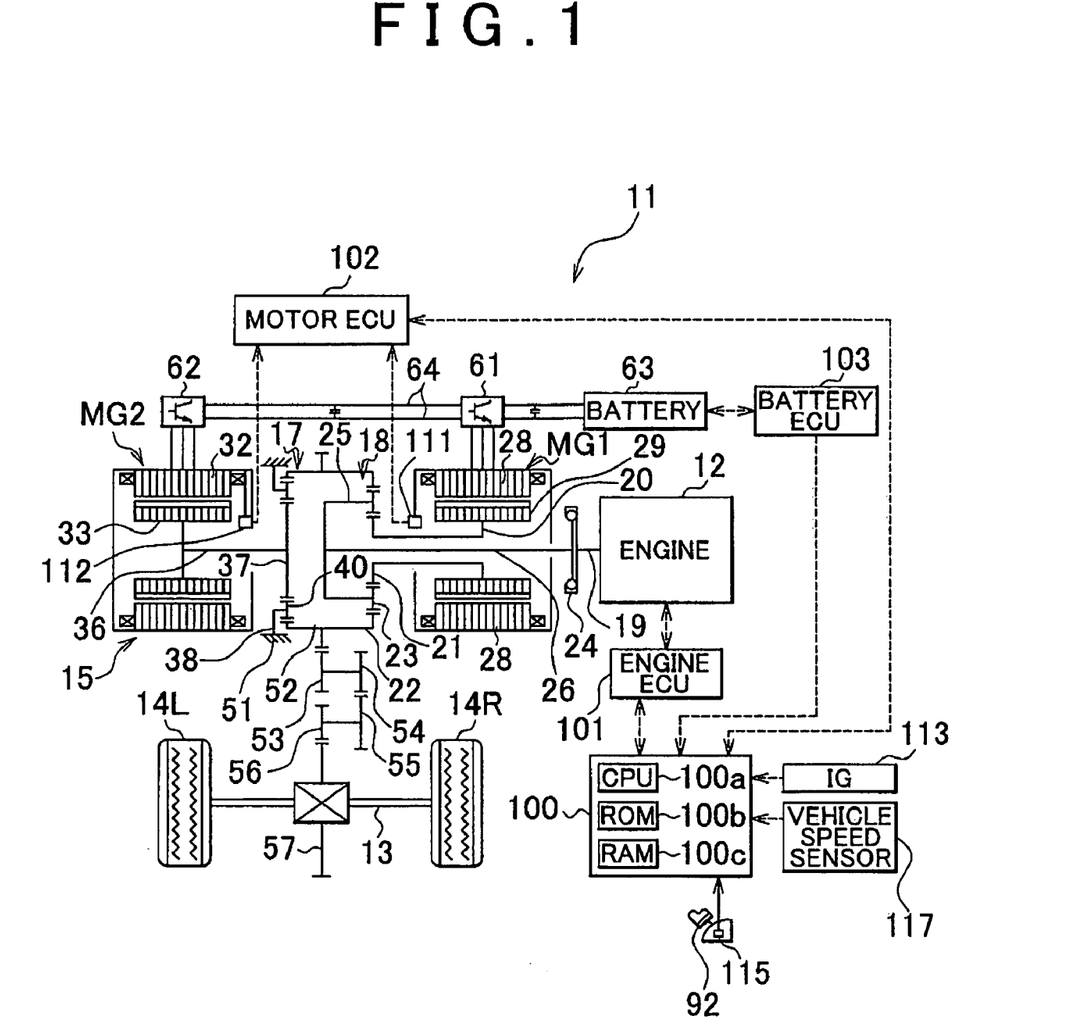
FIG. 1 is a schematic view showing the construction of a hybrid vehicle provided with a transmission and a power transmitting system according to a first embodiment of the invention.

Referring to FIG. 1, the hybrid vehicle 11 includes an engine 12 as an internal combustion engine, and further includes a power transmitting system 15 that transmits power from the engine 12 to driving wheels 14L, 14R via driveshafts (or half shafts) 13 as an output portion, and an electronic control unit 100 for a hybrid vehicle, which controls the whole system of the hybrid vehicle 11.

The power transmitting system 15 includes a first motor generator MG1, a second motor generator MG2 as a driving source, a reduction gear 17 connected to a rotor shaft 36 as an output shaft of the second motor generator MG2, and a power distribution mechanism 18 that distributes power among the reduction gear 17, engine 12 and the first motor generator MG1. The speed reduction ratio of the reduction gear 17 in power transmission from the second motor generator MG2 to the power distribution mechanism 18 is set to, for example, 2 to 1 or larger.

The engine 12 generates power using a hydrocarbon-base fuel, such as gasoline or light oil. An electronic control unit for an engine (which will be called "engine ECU") 101 receives signals from various sensors for detecting operating conditions of the engine 12, and controls the operation of the engine 12, for example, performs fuel injection control, ignition control and control for adjusting the intake air quantity.

The power distribution mechanism 18 has a sun gear 21 coupled to a hollow, sun gear shaft 20 through which a crankshaft 19 of the engine 12 extends along the axis of the shaft 20, a ring gear 22 integral with a ring gear of the reduction gear 17, two or more pinion gears 23 that rotate about their own axes while rotating around the sun gear 21, and a carrier 25 that has an input shaft 26 coupled to an end portion of the crankshaft 19 via a damper 24 and supports rotating shafts of the pinion gears 23. Thus, the power distribution mechanism 18 is in the form of a planetary gear mechanism having the sun gear 21, ring gear 22 and the carrier 25 as rotating elements that perform differential operations.

When the first motor generator MG1 functions as a generator, the power distribution mechanism 18 distributes power transmitted from the engine 12 to the carrier 25, between the sun gear 21 side and the ring gear 22 side, according to the gear ratio thereof. When the first motor generator MG1 functions as a motor, the power distribution mechanism 18 combines the power transmitted from the engine 12 to the carrier 25, and power transmitted from the first motor generator MG1 to the sun gear 21, and delivers the combined power to the ring gear 22 side.

In the meantime, the first motor generator MG1 includes a stator 28 that forms a rotating magnetic field, and a rotor 29 disposed inside the stator 28 and having a plurality of permanent magnets embedded therein. The stator 28 includes a stator core, and a three-phase coil wound around the stator core.

The rotor 29 is coupled to the sun gear shaft 20 that rotates as a unit with the sun gear 21 of the power distribution mechanism 18, and the stator core of the stator 28, which is formed by laminating magnetic steel plates together, is fixed to an inner circumferential wall of a case 51 which will be described later. Thus, the first motor generator MG1 is housed in the case 51.

The first motor generator MG1 constructed as described above operates as an electric motor when the rotor 29 is rotated or driven under the interaction between magnetic fields formed by the permanent magnets embedded in the rotor 29 and a magnetic field formed by the three-phase coil. Also, the first motor generator MG1 operates as a generator when an electromotive force is produced between the opposite ends of the three-phase coil under the interaction between the magnetic fields formed by the permanent magnets and rotation of the rotor 29.

The second motor generator MG2 includes a stator 32 that forms a rotating magnetic field, and a rotor 33 disposed inside the stator 32 and having a plurality of permanent magnets embedded therein. The stator 32 includes a stator core, and a three-phase coil wound around the stator core.

A rotor shaft 36 of the rotor 33 is fitted via splines into a sun gear 37 of the reduction gear 17, and a stator core of the stator 32, which is formed by laminating magnetic steel sheets together, is fixed to an inner circumferential wall of the case 51. Thus, the second motor generator MG2 is housed in the case 51.

The second motor generator MG2 operates as a generator when an electromotive force is produced between the opposite ends of the three-phase coil under the interaction between magnetic fields formed by the permanent magnets and rotation of the rotor 33. Also, the second motor generator MG2 operates as a motor when the rotor 33 is rotated or driven under the interaction between the magnetic fields formed by the permanent magnets and the magnetic field formed by the three-phase coil.

Figure 2:
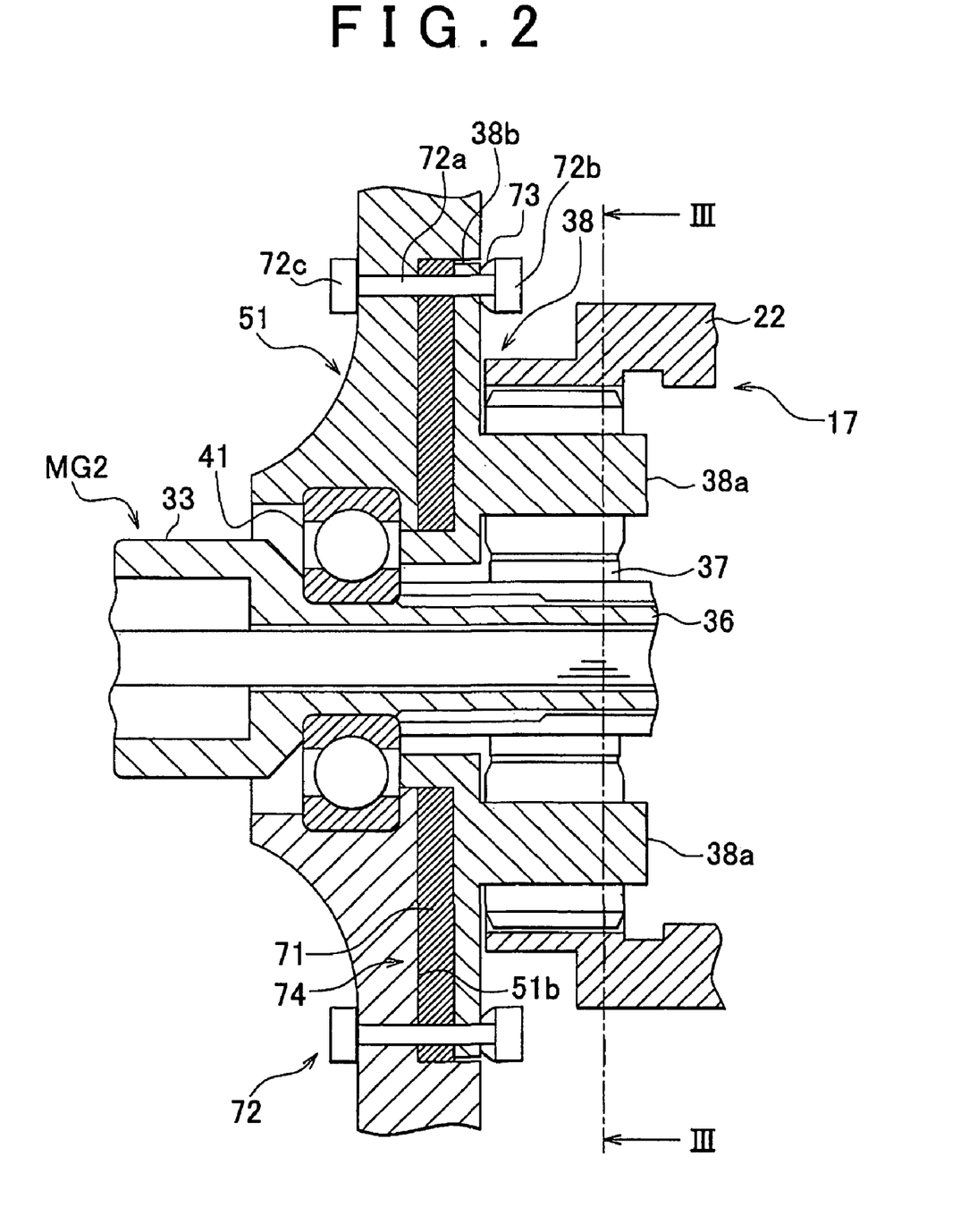
FIG. 2 is a cross-sectional view showing a principal part of a reduction gear as the transmission according to the first embodiment of the invention.
Figure 3:
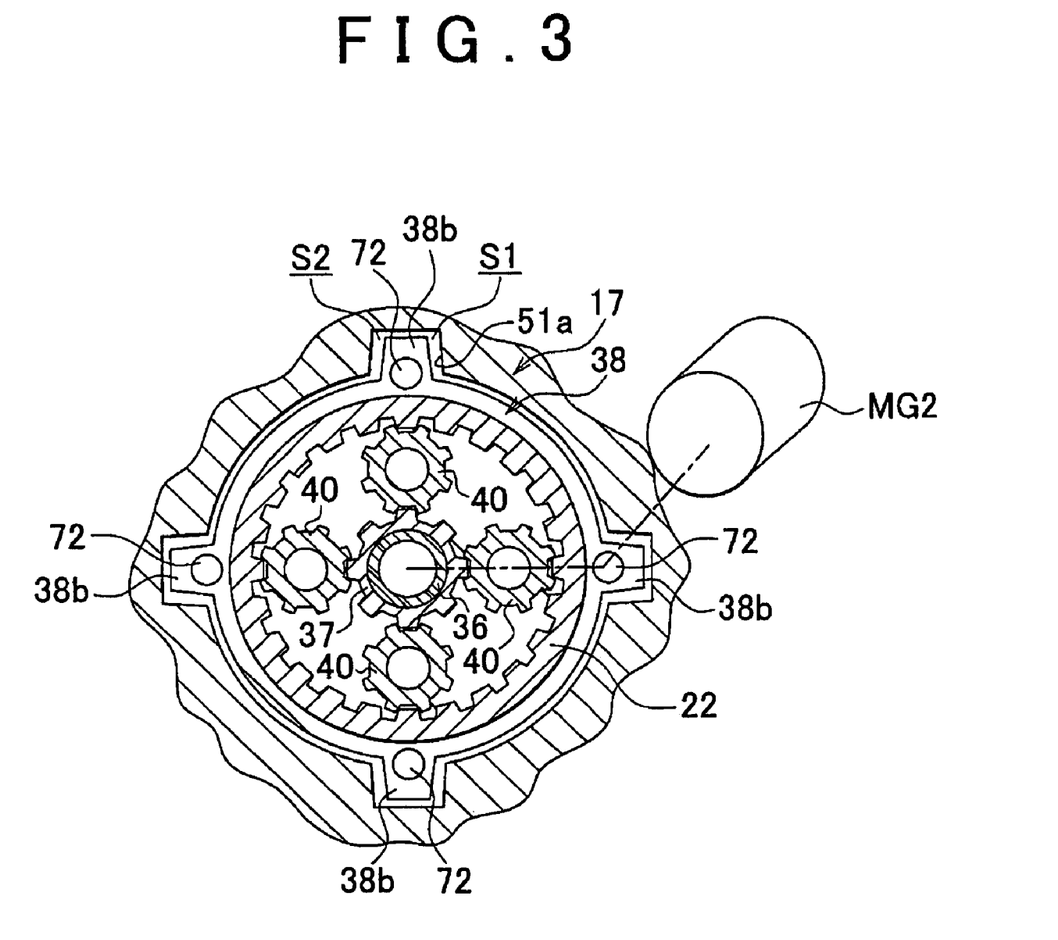
FIG. 3 is a cross-sectional view as seen in the direction of arrows m in FIG. 2.

As shown in FIG. 2 and FIG. 3, the reduction gear 17, which serves to reduce the speed of rotation of the second motor generator MG2, is constructed such that a carrier 38 as a rotating member that is one of rotating elements of a planetary gearset is fixed to the case 51 as a support member of the power transmitting system 15.

More specifically, as shown in FIG. 2 and FIG. 3, the reduction gear 17 includes the above-mentioned sun gear 37 as a first rotating element coupled to the rotor shaft 36, ring gear 22 as a third rotating element integral with the ring gear 22 of the power distribution mechanism 18, pinion gears 40, as a second rotating element, which mesh with the ring gear 22 and the sun gear 37 and transmit rotation of the sun gear 37 to the ring gear 22, and the above-mentioned carrier 38 having support shafts 38a that rotatably support the pinion gears 40.

In the reduction gear 17, the number of teeth of the ring gear 22 may be set to be, for example, twice or more as much as the number of teeth of the sun gear 37, so that the speed reduction ratio is set to 2 to 1 or larger. The rotor shaft 36 is rotatably supported by the case 51 via a bearing 41. In this embodiment, the reduction gear 17 and the case 51 constitute a transmission or change-speed gearbox.

Figure 4:
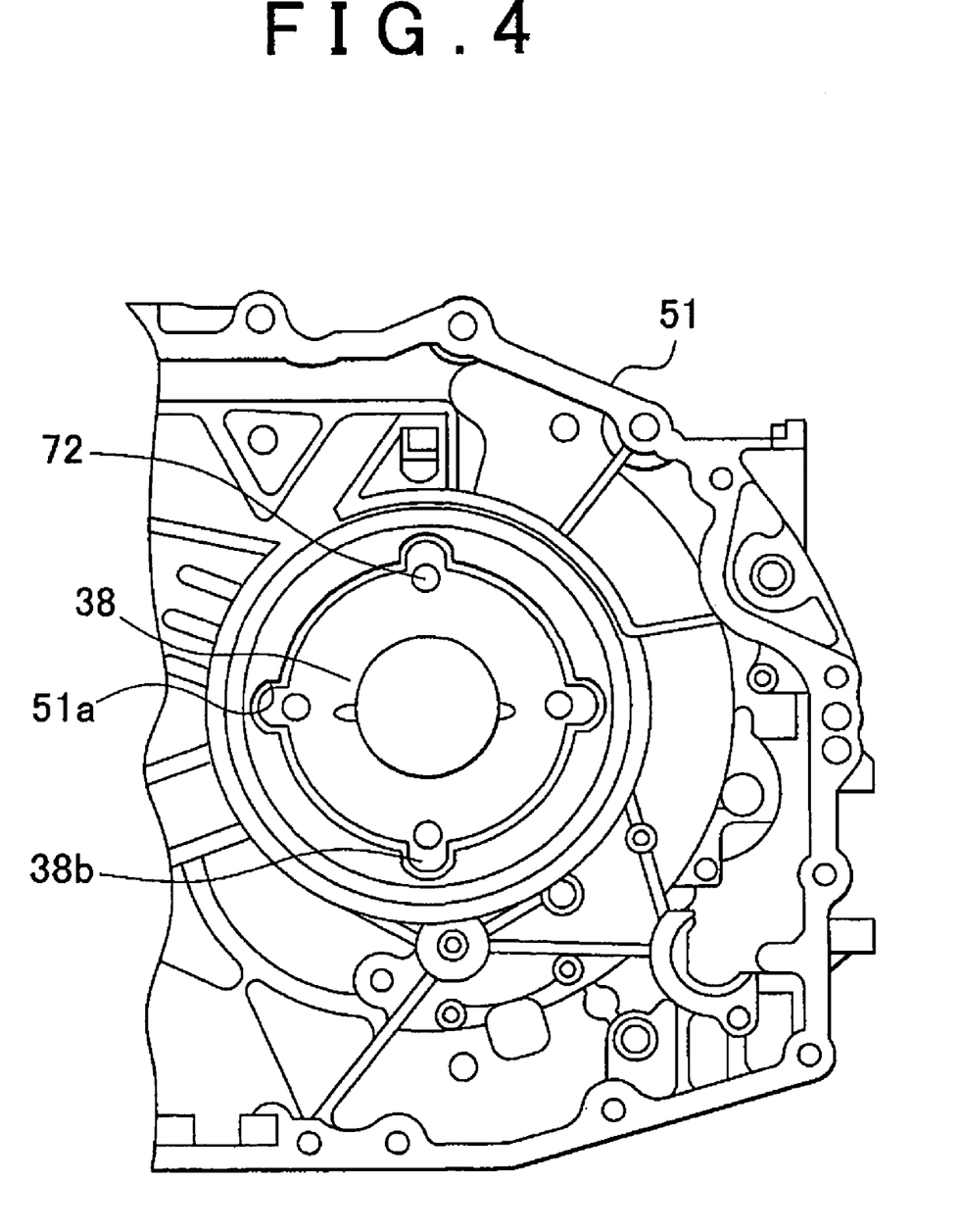
FIG. 4 is a view showing a principal part of a case of the power transmitting system according to the first embodiment of the invention.

As shown in FIG. 3 and FIG. 4, a plurality of grooves (recesses) 51a (four grooves in this embodiment) are formed in a radially inner portion of the case 51 of the power transmitting system 15, to be arranged in the circumferential direction thereof, and protrusions 38b that can be received in the grooves 51a are provided in a radially outer portion of the carrier 38.

While the grooves 51a are formed in the radially inner portion of the case 51 and the protrusions 38b are formed in the radially outer portion of the carrier 38 in this embodiment, protrusions may be formed in a radially inner portion of the case 51, and grooves that can receive the protrusions may be formed in a radially outer portion of the carrier 38.

Although only a part of the case 51 is illustrated in FIG. 3 and FIG. 4, the power distribution mechanism 15, first motor generator MG1 and the second motor generator MG2 are housed in the case 51.

The reduction gear 17 is mounted in the case 51 such that the protrusions 38b of the carrier 38 are fitted via splines into the grooves 51a of the case 51. With the reduction gear 17 thus mounted in the case 51, the protrusions 38b are fixedly received in the grooves 51a in the circumferential direction of the carrier 38, so that the carrier 38 is not able to rotate.

In order to facilitate mounting of the reduction gear 17 in the case 51, the width of each groove 51a is made larger than the width of each protrusion 38b, and gaps are formed between the grooves 51a and the protrusions 38b.

Referring back to FIG. 1, a counter drive gear 52 is provided as an integral part of the ring gear 22, at the outer periphery of the ring gear 22, and the counter drive gear 52 is arranged to rotate as a unit with the ring gear 22.

The counter drive gear 52 meshes with an idle drive gear 53, and the idle drive gear 53 is connected to a counter driven gear 55 via an idle driven gear 54.

The counter driven gear 55 is connected to a differential gear 57 via a final gear 56, and the differential gear 57 transmits driving torque to the driving wheels 14L, 14R via the driveshafts 13.

The first motor generator MG1 and the second motor generator MG2 are adapted to supply and receive electric power to and from a battery 63, via an inverter 61 and an inverter 62.

A power line 64 that connects the inverter 61 and inverter 62 with the battery 63 consists of positive-pole bus and negative-pole bus that are shared by the inverter 61 and inverter 62. In operation, electric power generated by one of the first motor generator MG1 and the second motor generator MG2 can be consumed by the other of the first motor generator MG1 and the second motor generator MG2.

Accordingly, the battery 63 is charged with electric power generated by either of the first motor generator MG1 and the second motor generator MG2, and is discharged so as to make up for a shortage of electric power. If the amount of electric power generated by one of the first motor generator MG1 and the second motor generator MG2 is balanced with that of electric power consumed by the other motor generator, the battery 63 is not charged nor discharged.

The first motor generator MG1 and the second motor generator MG2 are both driven under control of an electronic control unit for motors (which will be called "motor ECU") 102.

The motor ECU 102 receives signals necessary to control driving of the first motor generator MG1 and the second motor generator MG2. For example, the motor ECU 102 receives signals from rotational position detection sensor 111 and rotational position detection sensor 112 that detect the rotational positions of the rotors of the first motor generator MG1 and second motor generator MG2, respectively, and receives phase currents applied to the first motor generator MG1 and second motor generator MG2, which are detected by current sensors (not shown). Also, the motor ECU 102 sends switching control signals to the inverter 61 and the inverter 62.

The motor ECU 102, which communicates with the electronic control unit for the hybrid vehicle (which will be called "HV ECU") 100, controls driving of the first motor generator MG1 and the second motor generator MG2 according to control signals from the HV ECU 100, and sends data relating to the operating conditions of the first motor generator MG1 and second motor generator MG2 to the HV ECU 100 as needed.

The battery 63 is managed by an electronic control unit for a battery (which will be called "battery ECU") 103. The battery ECU 103 receives signals necessary to manage the battery 63, for example, receives a voltage across terminals of the battery 63 from a voltage sensor (not shown) installed between the terminals, charge/discharge current from a current sensor (not shown) mounted in the power line 64 connected to the output terminal of the battery 63, a battery temperature from a temperature sensor (not shown) mounted in the battery 63, and so forth. Also, the battery ECU 103 sends data relating to conditions of the battery 63 to the HV ECU 100 as needed.

The battery ECU 103 also calculates the state of charge (SOC) of the battery 63, based on the sum of the charge/discharge currents detected by the current sensor, so as to manage the battery 63.

As shown in FIG. 1, the HV ECU 100 consists of a microprocessor having CPU (central processing unit) 100a as a main component, and includes ROM (read-only memory) 100b that stores control programs, RAM (random access memory) 100c that temporarily stores data, and input and output ports and communication port (not shown), in addition to the CPU 100a.

The HV ECU 100 receives an ignition signal Ig from an ignition switch (IG) 113, an accelerator pedal depression signal Acc from an accelerator pedal position sensor 115 that detects the amount of depression of an accelerator pedal 92 by the driver, and a vehicle speed signal V from a vehicle speed sensor 117, via respective input ports.

The motor ECU 102 controls driving of the inverter 61 and the inverter 62 according to control signals received from the HV ECU 100, so as to rotate or drive the rotor 33 of the second motor generator MG2 in one direction or the other direction.

More specifically, when the accelerator pedal 92 is depressed, and an accelerator pedal depression signal Acc indicative of the amount of depression of the accelerator pedal 92 is received from the accelerator pedal position sensor 115, the second motor generator MG2 is rotated/driven in one direction, within an operating region of the second motor generator MG2, so as to transmit power to the driveshafts 13 via the reduction gear 17.

When the accelerator pedal 92 is released, and the accelerator pedal depression signal Acc is no longer received from the accelerator pedal position sensor 115, the second motor generator MG2 is rotated/driven in the other direction, so as to produce an engine braking effect.

As shown in FIG. 2, the case 51 has a carrier-facing surface 51b that is facing the carrier 38 in the axial direction of the rotor shaft 36, and a friction plate 71 made of a material, such as rubber, having a high coefficient of friction is interposed between the carrier-facing surface 51b of the case 51 and the carrier 38.

The friction plate 71 is formed in a disc-like shape, namely, is formed at a central portion thereof with a through-hole through which the rotor shaft 36 extends. It is to be understood that the shape of the friction plate 71 is not limited to the disc-like shape, but may be substantially identical with that of the carrier 38.

The case 51 and the carrier 38 are connected to each other by connecting members 72. Each of the connecting members 72 includes an inserted portion 72 that is inserted through the case 51 and the carrier 38, and abutting portions 72b, 72c that are formed at the opposite ends of the inserted portion 72a and abut on radially outer portions of the case 51 and carrier 38, so as to prevent the case 51 and the carrier 38 from being spaced a specified distance or more apart from each other.

In addition, a compression spring 73 as a pressing member is interposed between the abutting portion 72b of each of the connecting members 72 and the carrier 38, and the carrier 38 is pressed against the carrier-facing surface 51b of the case 51 via the friction plate 71 by means of the compression springs 73.

In this embodiment, the friction plate 71, connecting members 72 and the compression springs 73 constitute a friction producing mechanism 74 that produces frictional force to be applied from the carrier 38 to the carrier-facing surface 51b of the case 51.

If torque variations occur to the engine 12 during operation of the engine 12, the torque variations are transmitted from the crankshaft 19 of the engine 12 to the input shaft 26 of the power transmitting system 15. The torque variations are absorbed by the damper 24. However, if the damper 24 cannot sufficiently absorb the torque variations of the engine 12, the torque variations may be transmitted to the power distribution mechanism 18.

Since the torque varies continuously and alternately in the positive and negative directions, and the power distribution mechanism 18 and the reduction gear 17 have the common ring gear 22, the torque variations, if transmitted to the power distribution mechanism 18, are transmitted from the power distribution mechanism 18 to the reduction gear 17. If the torque variations are then transmitted from the ring gear 22 to the pinion gears 40 of the reduction gear 17, torque derived from the torque variations as external force is applied to the carrier 38 via the pinion gears 40.

If the varying torque is applied to the carrier 38, the carrier 38 rotates alternately in the clockwise direction and the counterclockwise direction as viewed in FIG. 3, by the amounts of gaps S1, S2 between each groove 51a of the case 51 and each protrusion 38b of the carrier 38, and unpleasant sound may be produced due to collisions between the protrusions 38b and the walls of the grooves 51a.

When the accelerator pedal 92 is depressed during high-load operation, or the like, in which the engine 12 and the second motor generator MG2 are both used for running the vehicle, and the HV ECU 100 receives an accelerator pedal depression signal Acc indicative of the amount of depression of the accelerator pedal 92 from the accelerator pedal position sensor 115, the HV ECU 100 controls the motor ECU 102 so as to rotate/drive the second motor generator MG2 in one direction, so that power is transmitted from the second motor generator MG2 to the driveshafts 13 via the reduction gear 17.

When the accelerator pedal 92 is released, and the HV ECU 100 no longer receives the accelerator pedal depression signal Acc from the accelerator pedal position sensor 115, the HV ECU 100 controls the motor ECU 102 to rotate/drive the second motor generator MG2 in the other direction, thereby to produce an engine braking effect.

In the above case, if torque produced during rotation of the second motor generator MG2 in forward and reverse directions is transmitted from the second motor generator MG2 to the pinion gears 40 via the sun gear 37, torque derived from the torque of the second motor generator MG2 as external force is applied to the carrier 38 via the pinion gears 40.

If the depression and release of the accelerator pedal 92 are repeated at short time intervals, positive torque and negative torque are alternately applied to the carrier 38. As a result, the carrier 38 rotates alternately in the clockwise direction and counterclockwise direction as viewed in FIG. 3, by the amounts of gaps S1, S2 between each groove 51a of the case 51 and each protrusion 38b of the carrier 38, and unpleasant sound may be produced due to collisions between the protrusions 38b and the walls of the grooves 51a.

In this embodiment in which the friction producing mechanism 74 is provided for applying frictional force from the carrier 38 to the carrier-facing surface 51b of the case 51, when the varying torque of the engine 12 or the torque of the second motor generator MG2 is transmitted to the carrier 38, the carrier 38 can be rotated gently or slowly relative to the carrier-facing surface 51b of the case 51.

It is therefore possible to alleviate or reduce impacts when the protrusions 38b of the carrier 38 collide with the walls of the grooves 51a of the case 51, and thus prevent the otherwise possible occurrence of unpleasant sound due to the collision between the carrier 38 and the case 51.

In this embodiment, the friction producing mechanism 74 includes the friction plate 71 interposed between the carrier 38 and the carrier-facing surface 51b of the case 51, the connecting members 72 each having the inserted portion 72a inserted through the carrier 38 and the case 51 and the abutting portions 72a, 72b provided at the opposite ends of the inserted portion 72a and abutting on the radially outer portions of the carrier 38 and case 51 so as to prevent the carrier 38 and the case 51 from being spaced by the specified distance or more from each other, and the compression springs 73 provided between the carrier 38 and the abutting portions 72b for pressing the carrier 38 against the carrier-facing surface 51b of the case 51 via the friction plate 71. Thus, the constructed friction producing mechanism 74 is able to make the entire area of one major surface of the friction plate 71 in sliding contact with the carrier-facing surface 51b of the case 51, via the carrier 38.

With the above arrangement, large frictional force can be produced between the carrier 38 and the case 51, and the carrier 38 can rotate more gently or slowly relative to the carrier-facing surface 51b of the case 51 when it receives torque derived from torque variations from the engine 12 via the pinion gears 40. Also, since the carrier 38 is mounted in the case 51 so as not to rotate relative to the case 51, and the friction plate 71 is interposed between the carrier 38 and the carrier-facing surface 51b of the case 51, the fuel efficiency can be improved as compared with the case where the carrier 38 is rotatably mounted in the case 51 and a friction plate is interposed between the carrier 38 and the carrier-facing surface 51b of the case 51. Namely, in the case where the friction plate is interposed between the carrier 38 and the carrier-facing surface 51b of the case 51, dragging torque appears between the carrier 38 and the carrier-facing surface 51b of the case 51 due to the frictional force produced between the friction plate and the carrier 38, which may result in deterioration of the fuel efficiency. In this embodiment, the carrier 38 is mounted in the case 51 so as not to rotate relative to the case 51, and the friction plate 71 is interposed between the carrier 38 and the carrier-facing surface 51b of the case 51. With this arrangement, otherwise possible deterioration of the fuel efficiency can be prevented even when the frictional force between the carrier 38 and the carrier-facing surface 51b of the case 51 increases.

Figure 5:
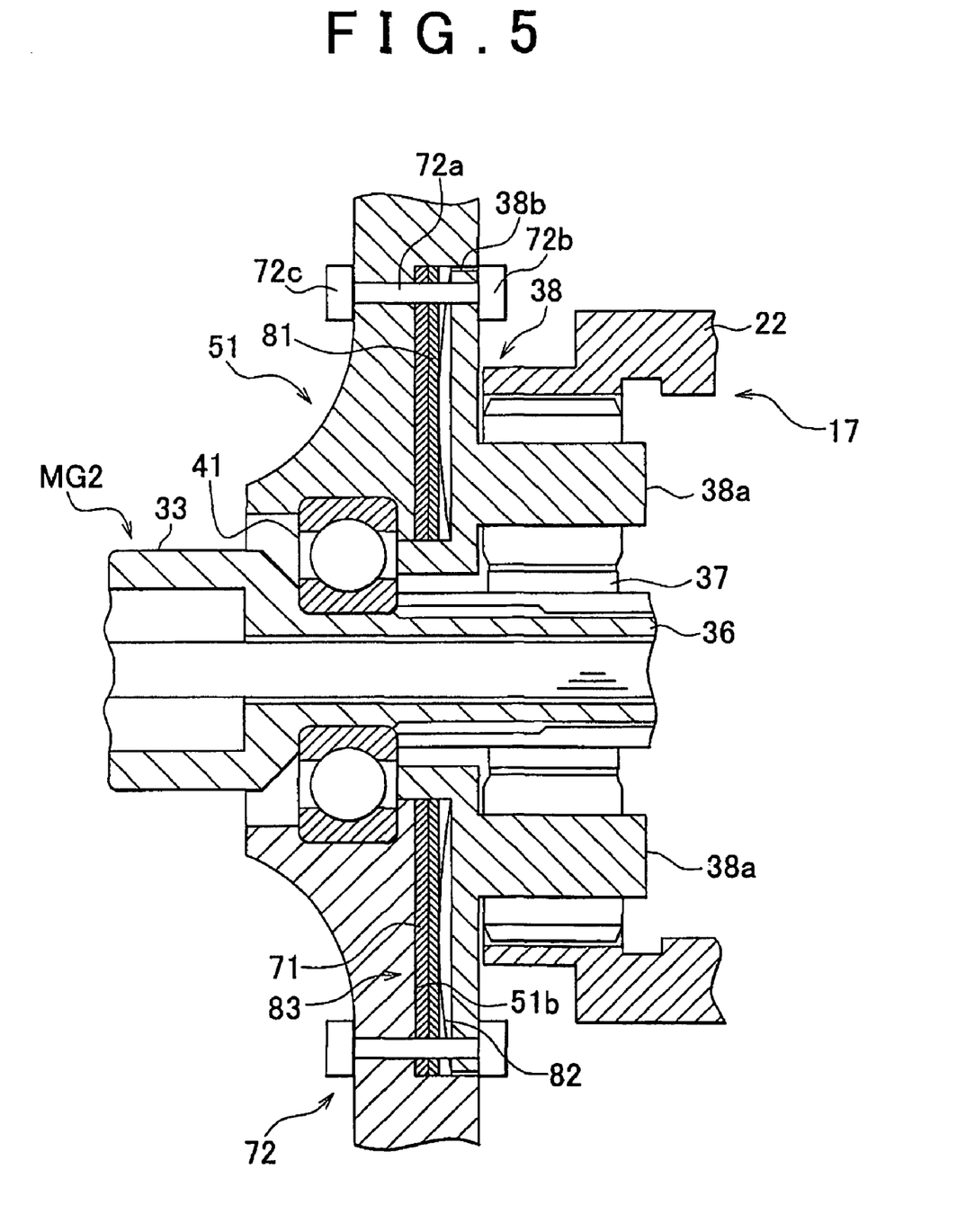
FIG. 5 is a cross-sectional view showing a principal part of a reduction gear as a transmission according to a second embodiment of the invention.

FIG. 5 illustrates a second embodiment of the invention. In FIG. 5, the same reference numerals as used in FIG. 2 are used for identifying the same components as those of the first embodiment, and explanation of these components will not be provided. As shown in FIG. 5, the friction plate 71 is interposed between the carrier 38 and the carrier-facing surface 51b of the case 51, and a contact plate 81 that is in contact with the entire area of one major surface of the friction plate 71 is provided between the friction plate 71 and the carrier 38.

Furthermore, a disc spring 82 as a biasing member is interposed between the contact plate 81 and the carrier 38, and the disc spring 82 biases or urges the contact plate 81 and the carrier 38 in opposite directions so that the contact plate 81 and the carrier 38 are separated from each other.

Also, in this embodiment, the abutting portions 72b, 72c of the connecting members 72 abut on radially outer portions of the case 51 and carrier 38, so that the case 51 and the carrier 38 are prevented from being spaced a specified distance or more from each other. Therefore, the bias force or spring force of the disc spring 82 makes it possible to produce large frictional force between the carrier 38 and the carrier-facing surface 51b of the case 51.

The biasing member interposed between the contact plate 81 and the carrier 38 is not limited to the disc spring 82, but may consist of two or more compression springs arranged at equal intervals in the circumferential direction of the carrier 38. In this embodiment, the friction plate 71, connecting members 72, contact plate 81 and the disc spring 82 constitute a friction producing mechanism 83.

In this embodiment, the friction plate 71 is interposed between the carrier 38 and the carrier-facing surface 51b of the case 51 while the contact plate 81 is interposed between the friction plate 71 and the carrier 38, and the abutting portions 72b, 72c of the connecting members 72 abut on the radially outer portions of the carrier 38 and the case 51, so that the carrier 38 and the case 51 are prevented from being spaced apart from each other by the specified distance or more. Therefore, the bias force of the disc spring 82 applied to the friction plate 71 via the contact plate 81 makes the entire area of one major surface of the friction plate 71 in sliding contact with the carrier-facing surface 51b of the case 51, and large frictional force can be produced between the carrier 38 and the carrier-facing surface 51b of the case 51.

With the above arrangement, when the varying torque of the engine 12 or the torque of the second motor generator MG2 is transmitted to the carrier 38, the carrier 38 can be rotated gently or slowly relative to the carrier-facing surface 51b of the case 51.

It is therefore possible to alleviate or reduce impacts when the protrusions 38b of the carrier 38 collide with the walls of the grooves 51a of the case 51, and thus prevent the occurrence of unpleasant sound due to the collision between the carrier 38 and the case 51.

Figure 6:
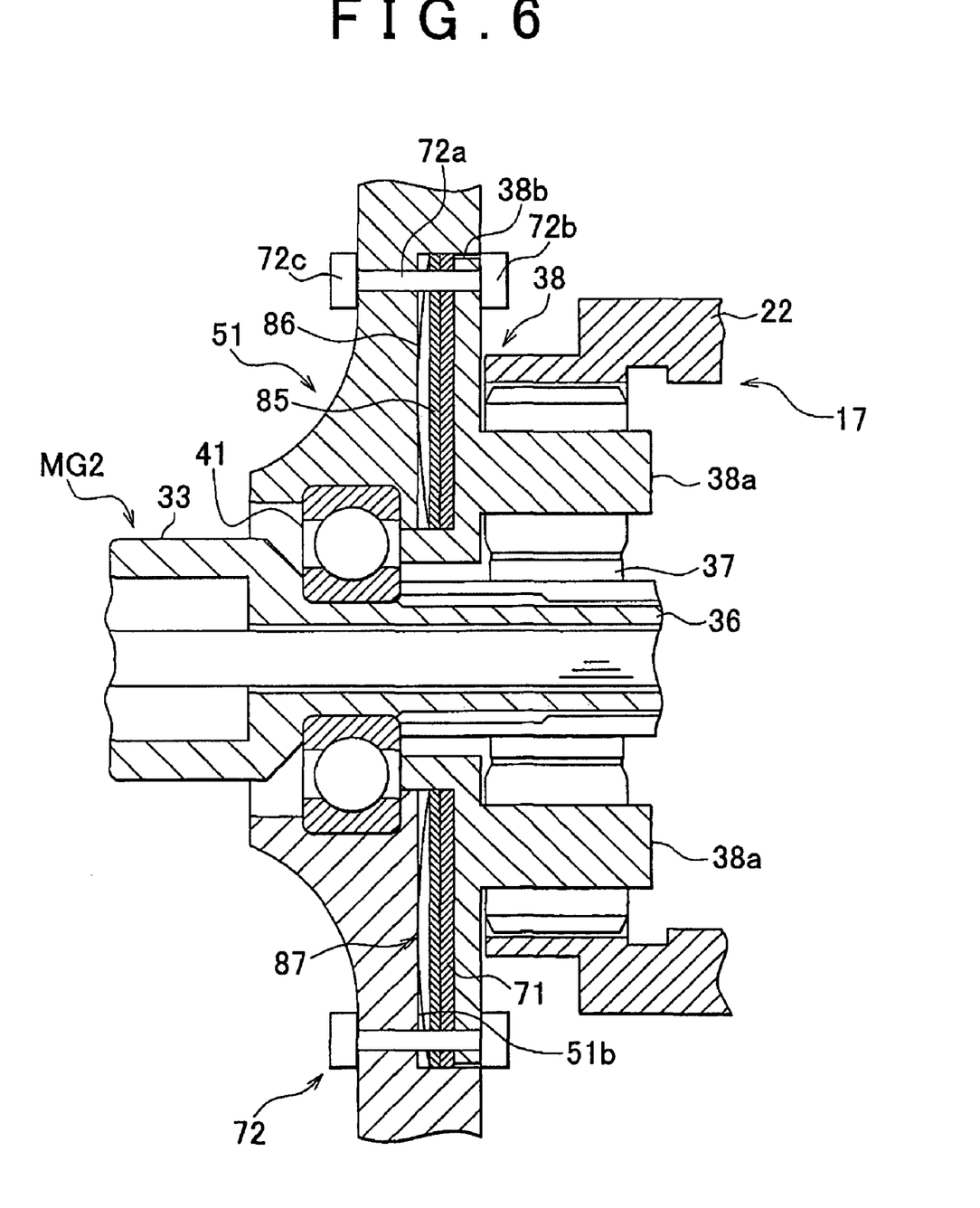
FIG. 6 is a cross-sectional view showing a principal part of a reduction gear as a transmission according to a third embodiment of the invention.

FIG. 6 illustrates a third embodiment of the invention. In FIG. 6, the same reference numerals as used in FIG. 2 are used for identifying the same components as those of the first embodiment, and explanation of these components will not be provided. As shown in FIG. 6, the friction plate 71 is interposed between the carrier 38 and the carrier-facing surface 51b of the case 51, and a contact plate 85 that is in contact with the entire area of one major surface of the friction plate 71 is provided between the friction plate 71 and the carrier-facing surface 51b of the case 51.

Furthermore, a disc spring 86 as a biasing member is interposed between the contact plate 85 and the carrier-facing surface 51b of the case 51, and the disc spring 86 biases or urges the contact plate 85 and the case 51 in opposite directions so that the contact plate 85 is separated from the case 51.

In this embodiment, the abutting portions 72b, 72c of the connecting members 72 abut on radially outer portions of the case 51 and carrier 38, so as to prevent the case 51 and the carrier 38 from being spaced a specified distance or more from each other, and therefore, large frictional force can be produced between the carrier 38 and the carrier-facing surface 51b of the case 51 under the bias force of the disc spring 86.

The biasing member interposed between the contact plate 85 and the case 51 is not limited to the disc spring 86, but may consist of two or more compression springs arranged at equal intervals in the circumferential direction of the case 51. In this embodiment, the friction plate 71, connecting members 72, contact plate 85 and the disc spring 86 constitute a friction producing mechanism 87.

In this embodiment, the friction plate 71 is interposed between the carrier 38 and the carrier-facing surface 51b of the case 51 while the contact plate 85 is interposed between the friction plate 71 and the carrier-facing surface 51b of the case 51b, and the abutting portions 72b, 72c of the connecting members 72 abut on the radially outer portions of the carrier 38 and case 51 so as to prevent the carrier 38 and the case 51 from being spaced from each other by the specified distance or more. Therefore, the bias force of the disc spring 86 applied to the friction plate 71 via the contact plate 85 makes the entire area of one major surface of the friction plate 71 in sliding contact with the carrier 38, and large frictional force can be produced between the carrier 38 and the carrier-facing surface 51b of the case 51.

With the above arrangement, when the varying torque of the engine 12 or the torque of the second motor generator MG2 is transmitted to the carrier 38, the carrier 38 can be rotated gently relative to the carrier-facing surface 51b of the case 51.

It is therefore possible to alleviate or reduce impacts when the protrusions 38b of the carrier 38 collide with the walls of the grooves 51a of the case 51, and thus suppress or prevent the occurrence of unpleasant sound due to the collision between the carrier 38 and the case 51.

While the present invention is applied to a hybrid vehicle in each of the illustrated embodiments, the invention is not limitedly applied to this type of vehicle, but may be applied to other types of vehicles having automatic transmissions. The invention may also be applied to transmissions other than those of vehicles, provided that a plurality of rotating elements are interposed between a driving source and an output portion, and the transmission has a rotating member that rotatably supports one of the rotating elements, and a support member in which the rotating member is mounted such that the rotating member is not able to rotate relative to the support member.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

While the compression springs 73 are provided for pressing the connecting members 72 in the first embodiment of the invention, the connecting members 72 may be pressed with other means providing certain torque, instead of the compression springs 73. Also, the connecting members 72 may be pressed with certain force without having the friction plate 71 and the contact plate 85 inserted between the carrier-facing surface 51b of the case 51 and the carrier 38. Thus, the friction producing mechanism may be in any form provided that a sufficient frictional force is produced between the carrier-facing surface 51b of the case 51 and the carrier 38.

What is claimed is:

1. A transmission comprising:
a plurality of rotating elements interposed between a driving source and an output portion;
a rotating member that rotatably supports one of the rotating elements, and is formed at a radially outer portion thereof with a plurality of recesses or protrusions;
a support member having a surface, that is facing the rotating member, and a plurality of protrusions or recesses formed in a radially inner portion thereof, said protrusions or recesses of the support member engaging with the recesses or protrusions of the rotating member, said rotating member being mounted in the support member such that the rotating member is not able to rotate; and
a friction producing mechanism that is provided between the rotating member and said surface of the support member and is arranged to produce a frictional force between the rotating member and the surface of the support member.

2. The transmission according to claim 1, wherein the friction producing mechanism applies a specified force to the rotating member and the support member in a direction in which the rotating member and the support member are facing each other.

3. The transmission according to claim 2, wherein:
the friction producing mechanism comprises a connecting member having an inserted portion that is inserted through the rotating member and the support member, and having abutting portions provided at opposite ends of the inserted portion and abutting on radially outer portions of the rotating member and the support member so as to prevent the rotating member and the support member from being spaced apart from each other by a specified distance or more; and
the connecting member applies the specified force to the rotating member and the support member in the direction in which the rotating member and the support member are facing each other.

4. The transmission according to claim 2, wherein the friction producing mechanism comprises a friction plate interposed between the rotating member and the surface of the support member.

5. The transmission according to claim 1, wherein:
the friction producing mechanism includes a friction plate interposed between the rotating member and the surface of the support member;
the friction producing mechanism further includes a connecting member having an inserted portion that is inserted through the rotating member and the support member, and having abutting portions provided at opposite ends of the inserted portion and abutting on radially outer portions of the rotating member and the support member so as to prevent the rotating member and the support member from being spaced apart from each other by a specified distance or more; and
the friction producing mechanism further includes a pressing member that is provided between the rotating member and one of the abutting portions for pressing the rotating member against the surface of the support member via the friction plate.

6. The transmission according to claim 1, wherein:
the friction producing mechanism includes a friction plate interposed between the rotating member and the surface of the support member;
the friction producing mechanism further includes a connecting member having an inserted portion that is inserted through the rotating member and the support member, and having abutting portions provided at opposite ends of the inserted portion and abutting on radially outer portions of the rotating member and the support member so as to prevent the rotating member and the support member from being spaced apart from each other by a specified distance or more; and
the friction producing mechanism further includes a contact plate provided between the friction plate and the rotating member and arranged to contact the entire area of one surface of the friction plate; and
the friction producing mechanism further includes a biasing member interposed between the contact plate and the rotating member and arranged to bias the contact plate and the rotating member in opposite directions so that the contact plate and the rotating member are separated from each other.

7. The transmission according to claim 1, wherein
the friction producing mechanism includes a friction plate interposed between the rotating member and the surface of the support member;
the friction producing mechanism further includes a connecting member having an inserted portion that is inserted through the rotating member and the support member, and abutting portions provided at opposite ends of the inserted portion and abutting on radially outer portions of the rotating member and the support member so as to prevent the rotating member and the support member from being spaced from each other by a specified distance or more; and
the friction producing mechanism further includes a contact plate provided between the friction plate and the support member and arranged to contact the entire area of one surface of the friction plate; and
the friction producing mechanism further includes a biasing member interposed between the contact plate and the support member and arranged to bias the contact plate and the support member in opposite directions so that the contact plate and the support member are separated from each other.

8. A power transmitting system comprising:
the transmission according to claim 1, the power transmitting system being adapted to transmit power of an internal combustion engine to the output portion via the transmission; and
a motor generator operable as the driving source, wherein said plurality of rotating elements comprise a first rotating element connected to an output shaft of the motor generator, a second rotating element that meshes with the first rotating element, and a third rotating element that meshes with the second rotating element and is connected to the internal combustion engine and the output portion, said second rotating element being rotatably supported by the rotating member.

* * * * *